United States Patent
Xue et al.

(10) Patent No.: US 11,917,597 B2
(45) Date of Patent: Feb. 27, 2024

(54) METHODS AND APPARATUSES FOR GENERATING DYNAMIC CODE BLOCK GROUP IN SIDELINK

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/331,511

(22) Filed: May 26, 2021

(65) Prior Publication Data

US 2022/0386305 A1   Dec. 1, 2022

(51) Int. Cl.
| | |
|---|---|
| *H04L 5/00* | (2006.01) |
| *H04L 1/16* | (2023.01) |
| *H04W 4/46* | (2018.01) |
| *H04W 72/0453* | (2023.01) |
| *H04W 76/14* | (2018.01) |
| *H04L 1/00* | (2006.01) |
| *H04W 72/0446* | (2023.01) |

(52) U.S. Cl.
CPC ....... *H04W 72/0453* (2013.01); *H04L 1/0063* (2013.01); *H04W 72/0446* (2013.01); *H04W 76/14* (2018.02)

(58) Field of Classification Search
CPC .......... H04W 72/0453; H04W 52/383; H04W 72/0446; H04W 76/14; H04W 28/06; H04W 92/18; H04L 5/0094; H04L 1/0063; H04L 1/1628; H04L 5/003; H04L 5/0055; H04L 1/0003; H04L 1/0009; H04L 27/0006; H04L 5/001
USPC .......................................... 370/330
See application file for complete search history.

(56) References Cited

U.S. PATENT DOCUMENTS

| | | | |
|---|---|---|---|
| 2018/0323830 A1* | 11/2018 | Park ........................ | H04L 5/001 |
| 2019/0327024 A1* | 10/2019 | Lee ...................... | H04L 27/2604 |
| 2020/0059327 A1* | 2/2020 | Kini ...................... | H04L 5/0055 |

(Continued)

FOREIGN PATENT DOCUMENTS

| | | |
|---|---|---|
| WO | 2020142987 A1 | 7/2020 |
| WO | 2020144261 A1 | 7/2020 |

(Continued)

OTHER PUBLICATIONS

International Search Report and Written Opinion—PCT/US2022/072320—ISA/EPO—dated Aug. 26, 2022.

*Primary Examiner* — Edan Orgad
*Assistant Examiner* — Vanneilian Lalchinthang
(74) *Attorney, Agent, or Firm* — ArentFox Schiff LLP

(57) ABSTRACT

Aspects of the present disclosure include methods, apparatuses, and computer readable media for configuring, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and transmitting the first CBG, the second CBG, and the SCI via a physical sidelink shared channel (PSSCH) to a second UE.

30 Claims, 13 Drawing Sheets

(56) References Cited

U.S. PATENT DOCUMENTS

| | | | | |
|---|---|---|---|---|
| 2020/0059341 A1* | 2/2020 | Zhang | .................. | H04W 72/23 |
| 2020/0228247 A1* | 7/2020 | Guo | .................... | H04W 52/383 |
| 2020/0235759 A1* | 7/2020 | Ye | ...................... | H03M 13/1105 |
| 2020/0344722 A1* | 10/2020 | He | ........................ | H04L 1/1819 |
| 2020/0374978 A1* | 11/2020 | Panteleev | ............. | H04W 72/02 |
| 2021/0320759 A1* | 10/2021 | Lee | ....................... | H04L 1/1854 |
| 2022/0321308 A1* | 10/2022 | Yu | ......................... | H04L 1/1812 |
| 2022/0346126 A1* | 10/2022 | Li | ........................ | H04L 5/0094 |

FOREIGN PATENT DOCUMENTS

| | | | | |
|---|---|---|---|---|
| WO | WO-2020144261 A1 * | 7/2020 | ........... | H04L 1/1607 |
| WO | 2021038001 A1 | 3/2021 | | |
| WO | WO-2021038001 A1 * | 3/2021 | ........... | H04L 1/1607 |

* cited by examiner

METHODS AND APPARATUSES FOR GENERATING DYNAMIC CODE BLOCK GROUP IN SIDELINK

BACKGROUND

Aspects of the present disclosure relate generally to wireless communications, and more particularly, to methods and apparatuses for generating dynamic code block group in sidelink.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a user equipment (UE) may transmit information directly to another UE via one or more sidelink channels. The transmitting UE may organize information in code block groups (CBGs) that are time division multiplexed. However, time division multiplexed CBGs may cause unreliability due to time-domain burst interference, leading to one or more CBGs not being properly received by the receiving UE. Therefore, improvements in sidelink transmission may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a first user equipment (UE) for configuring, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and transmitting the first CBG, the second CBG, and the SCI via a physical sidelink shared channel (PSSCH) to a second UE.

Other aspects of the present disclosure include a first user equipment (UE) having a memory comprising instructions, a transceiver, and one or more processors operatively coupled with the memory and the transceiver, the one or more processors configured to execute instructions in the memory to configure, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and transmit the first CBG, the second CBG, and the SCI via a physical sidelink shared channel (PSSCH) to a second UE.

An aspect of the present disclosure includes a first user equipment (UE) including means for configuring, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and means for transmitting the first CBG, the second CBG, and the SCI via a physical sidelink shared channel (PSSCH) to a second UE.

Some aspects of the present disclosure include non-transitory computer readable media having instructions stored therein that, when executed by one or more processors of a first user equipment (UE), cause the one or more processors to configure, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and transmit the first CBG, the second CBG, and the SCI via a physical sidelink shared channel (PSSCH) to a second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
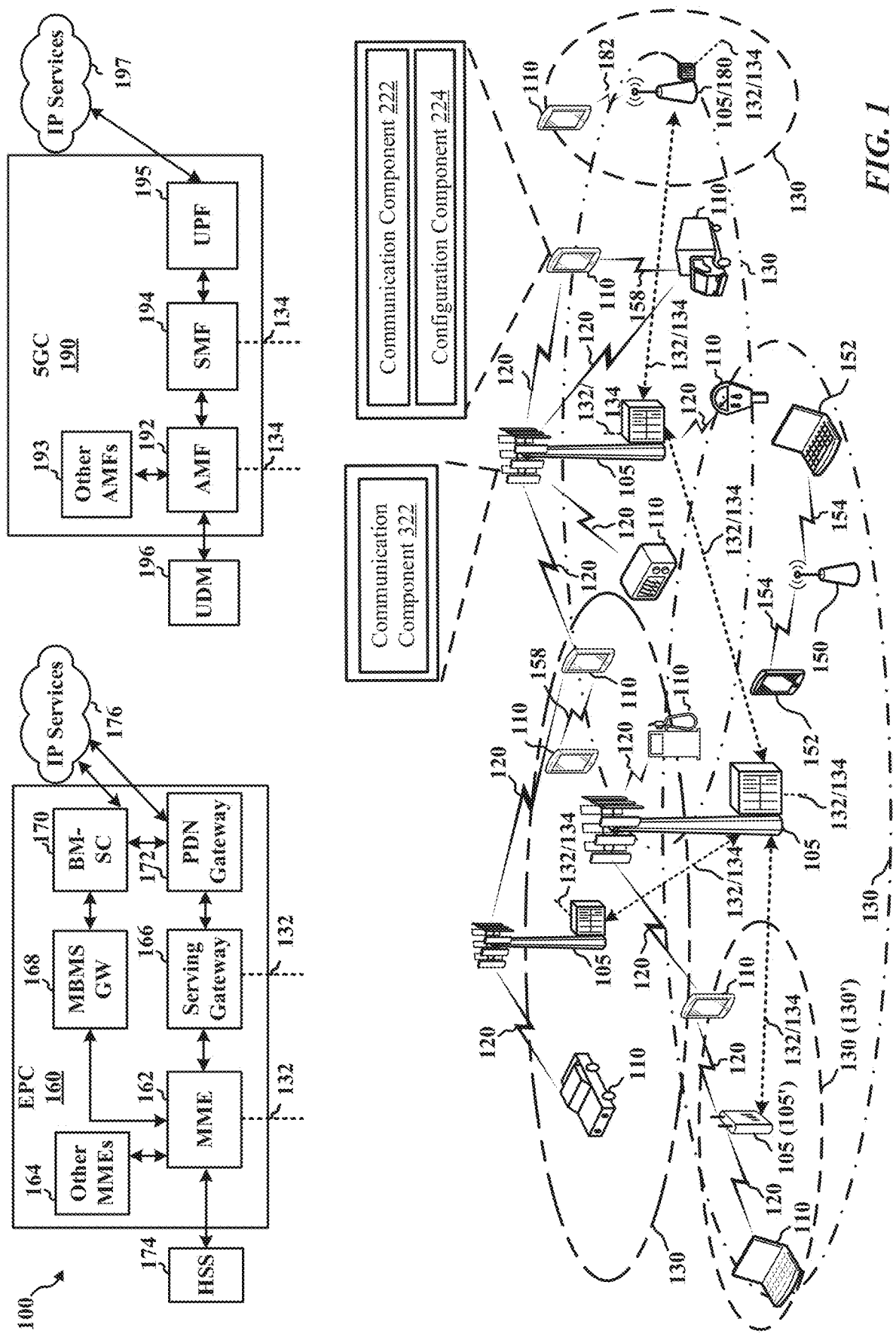
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some implementations, new radio (NR) sidelink (SL) may be used by a user equipment (UE) for exchanging messages (e.g., safety related messages), which may be periodical and/or of relatively small packet size, with nearby UEs. The SL communication may be over sub-6 gigahertz (GHz) licensed bands. In mode 1 for in-coverage deployment, the transmit (TX) UE may receive a grant from a base station (BS), such as a gNB, for SL channel access. In mode 2 for autonomous deployment, the TX UE may use sensing to perform distributed channel access. Each SL channel access may include a physical sidelink control channel (PSCCH) and/or physical sidelink shared channel (PSSCH), occupying at least one sub-channel to transmit one transport block (TB) of information. SL control information (SCI) may be transmitted to include control information regarding the receive (RX) UE and/or how to decode the TB. In some instances, the TX UE may transmit a "jumbo" TB (e.g., PSSCH with more than 1 sub-channel). To improve the reliability of unicast and/or groupcast transmission, the TX UE may request in SCI a TB-based hybrid automatic repeat request (HARQ) from the RX UE. The RX UE, in response to receiving the HARQ request, may transmit a HARQ response over a physical sidelink feedback channel (PSFCH).

In certain implementations, it may be desirable to transmit sidelink information over both sub-6 GHz bands and other licensed and unlicensed bands. For example, there is approximately 1.8 GHz of bandwidth available in the 5 GHz/6 GHz unlicensed band and approximately 7 GHz of bandwidth available in the 60 GHz unlicensed band. Such bandwidths availability may result in different deployment scenarios and/or use cases than conventional networks.

In certain implementations, enhanced mobile broadband (eMBB) traffic may be implemented in sidelink communication. As a result, "jumbo" TBs (e.g., physical sidelink shared channel (PSSCH) with more than 1 sub-channel) may be used for transmitting data bursts. However, retransmission of jumbo TBs (due to loss) may lead to low spectral efficiency. Therefore code block group (CBG) based transmission (TX) may be implemented.

In some implementations, interference may be due to noticeable frequency selectivity. For example, interference may be due to the sub-channel based channel access of NR SL, and/or 20 MHz channelization in the 5 GHz/6 GHz unlicensed spectrum. Therefore, existing CBG in Uu developed to mitigate interference time selectivity may be unsuitable. A CBG based hybrid automatic repeat request (HARM) mechanism to address interference frequency selectivity may be desirable.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. The UE 110 may include a configuration component 224 configured to configure frequency division multiplexed CBG in a slot for sidelink communication. In some implementations, the communication component 222 and the configuration component 224 may be implemented using hardware, software, or a combination of hardware and software. In some implementations, the BS 105 may include a communication component 322 configured to communicate with the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
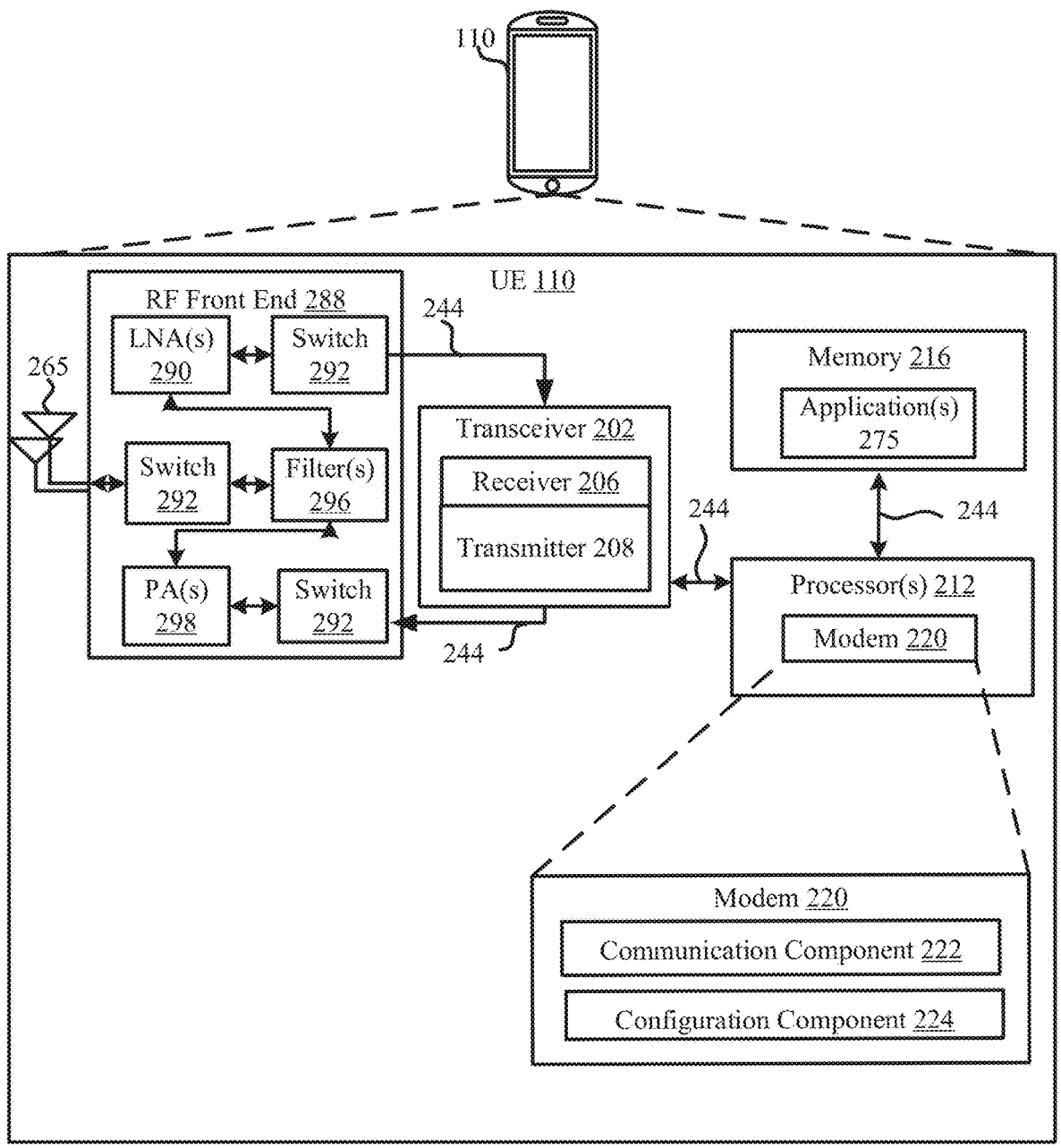
FIG. 2 is a schematic diagram of an example of a user equipment according to aspects of the present disclosure.

Referring to FIG. 2, one example of an implementation of the UE 110 may include a modem 220 having the communication component 222 and the configuration component 224. In one implementation, the UE 110 may include a communication component 222 configured to communicate with the BS 105 via a cellular network, a Wi-Fi network, or other wireless and wired networks. The UE 110 may include a configuration component 224 configured to configure frequency division multiplexed CBG in a slot for sidelink communication.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and the configuration component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222 and the configuration component 224, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and the configuration component 224, and/or one or more of the subcomponents, and/or data associated therewith, when UE 110 is operating at least one processor 212 to execute the communication component 222 and the configuration component 224, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
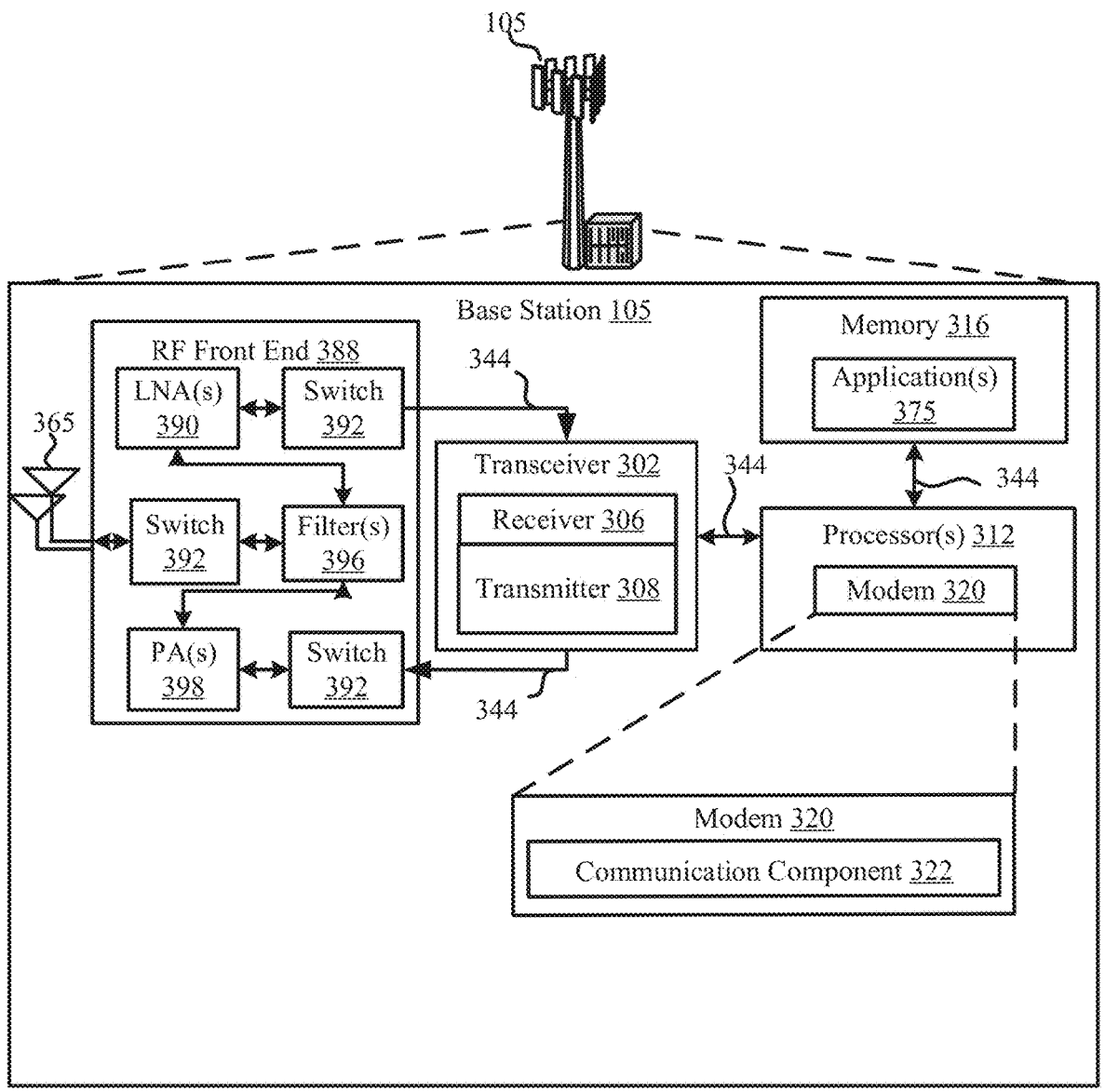
FIG. 3 is a schematic diagram of an example of a base station according to aspects of the present disclosure.

Referring to FIG. 3, one example of an implementation of the BS 105 may include a modem 320 having the communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
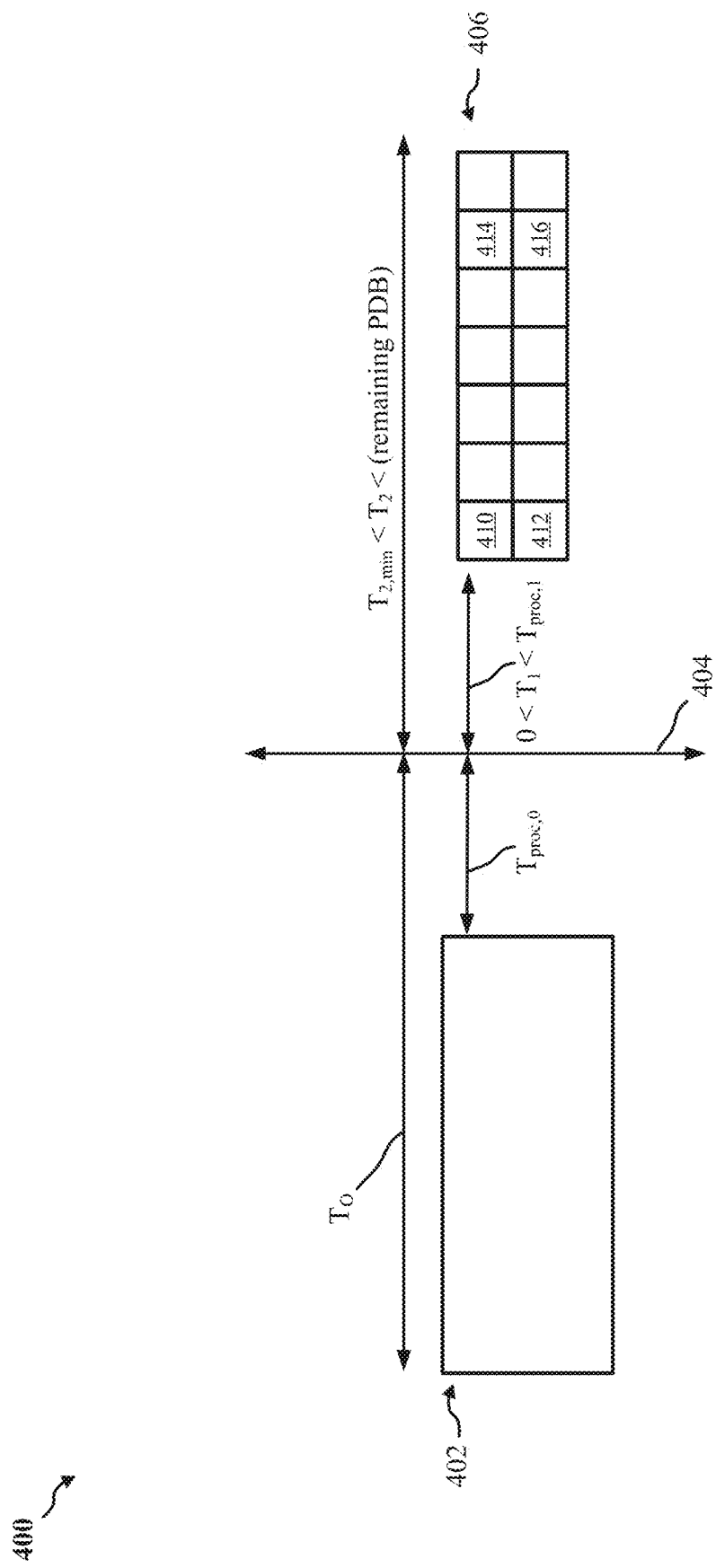
FIG. 4 shows an example of a diagram illustrating interference frequency selectivity according to aspects of the present disclosure.

FIG. 4 shows an example of a diagram illustrating interference frequency selectivity. In some implementations, the UE 110 in NR SL mode 2 may identify available resources for a resource selection window 406 via over the air (OTA) measurement/monitoring within a sensing window 402 during $T_O$. After a resource selection trigger 404 (e.g., $T_{proc,0}$ after the end of the sensing window 402), the UE 110 may select resources (after $T_1$) during the resource selection window 406. The available resources may include a first resource 410, a second resource 412, a third resource 414, and a fourth resource 416. The physical layer (PHY) may report to the medium access control (MAC) layer the set of resources that are available based on requests (e.g., size, such as the number of sub-channels, of channel access and/or a minimum number of candidates to facilitate random resource selection by MAC.

In some implementations, in heavy loading cases PHY may relax the reference signal received power (RSRP) threshold to include sufficient number of candidates. For example, the pair of the first resource 410 and the second resource 412, and the pair of the third resource 414 and the fourth resource 416 may be reported to be available for two sub-channel access. However, the second resource 412 and the third resource 414 may be available due to relaxed RSRP threshold (i.e., presence of interference).

Figure 5:
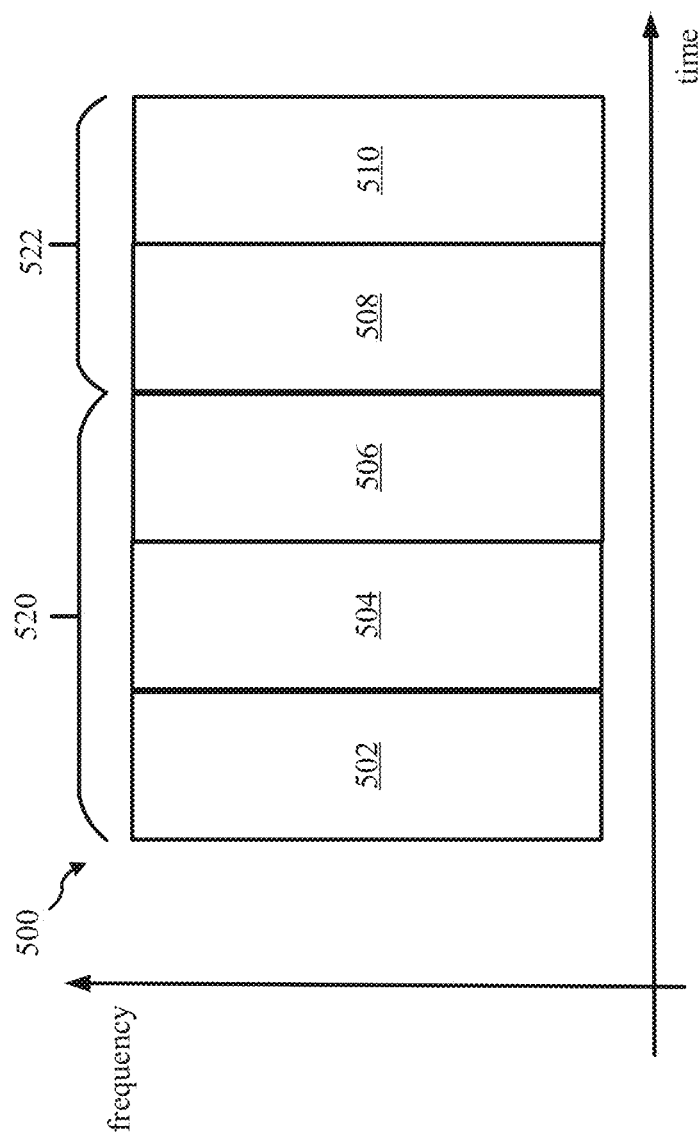
FIG. 5 illustrates an example of a transport block having code block groups for sidelink communications according to aspects of the present disclosure.

FIG. 5 illustrates an example of a transport block having code block groups for sidelink communications. Each CBG may include two or more CBs. A TX UE may transmit a transport block (TB) 500 having a first CBG 520 and a second CBG 522 to a RX UE. In some implementations, the first CBG 520 may include a first code block (CB) 502, a second CB 504, and a third CB 506. The second CBG 522 may include a fourth CB 508 and a fifth CB 510. The higher layer may specify (e.g., for physical downlink shared channel (PDSCH) or physical uplink shared channel (PUSCH)) a maxCodeBlockGroupsPerTransportBlock parameter, denoted as N. After receiving the TB 500, the number of CBGs may be determined as M=min(N,C), where C is the number of CBs in the TB 500. Mapping from CBs to CBGs may be determined by using the formulas $M_1$=mod(C,M), $K_1$=⌈C/M⌉, and $K_2$=⌊C/M⌋. If $M_1$>0, CBG m, m=0, 1, . . . , $M_1$−1, may include CBs with indices m*$K_1$+k, k=0, 1, . . . , $K_1$−1. CBG m where m=$M_1$, $M_1$+1, . . . , M−1, may include CBs with indices $M_1$*$K_1$+(m−$M_1$)*$K_2$+k, k=0, 1, . . . , $K_2$−1. In the TB 500 shown in FIGS. 5, N=2 and C=5. In some instances, NR may apply frequency-first rate matching shown in FIG. 5, with which CBG transmission may mitigate time-domain burst interference.

Figure 6:
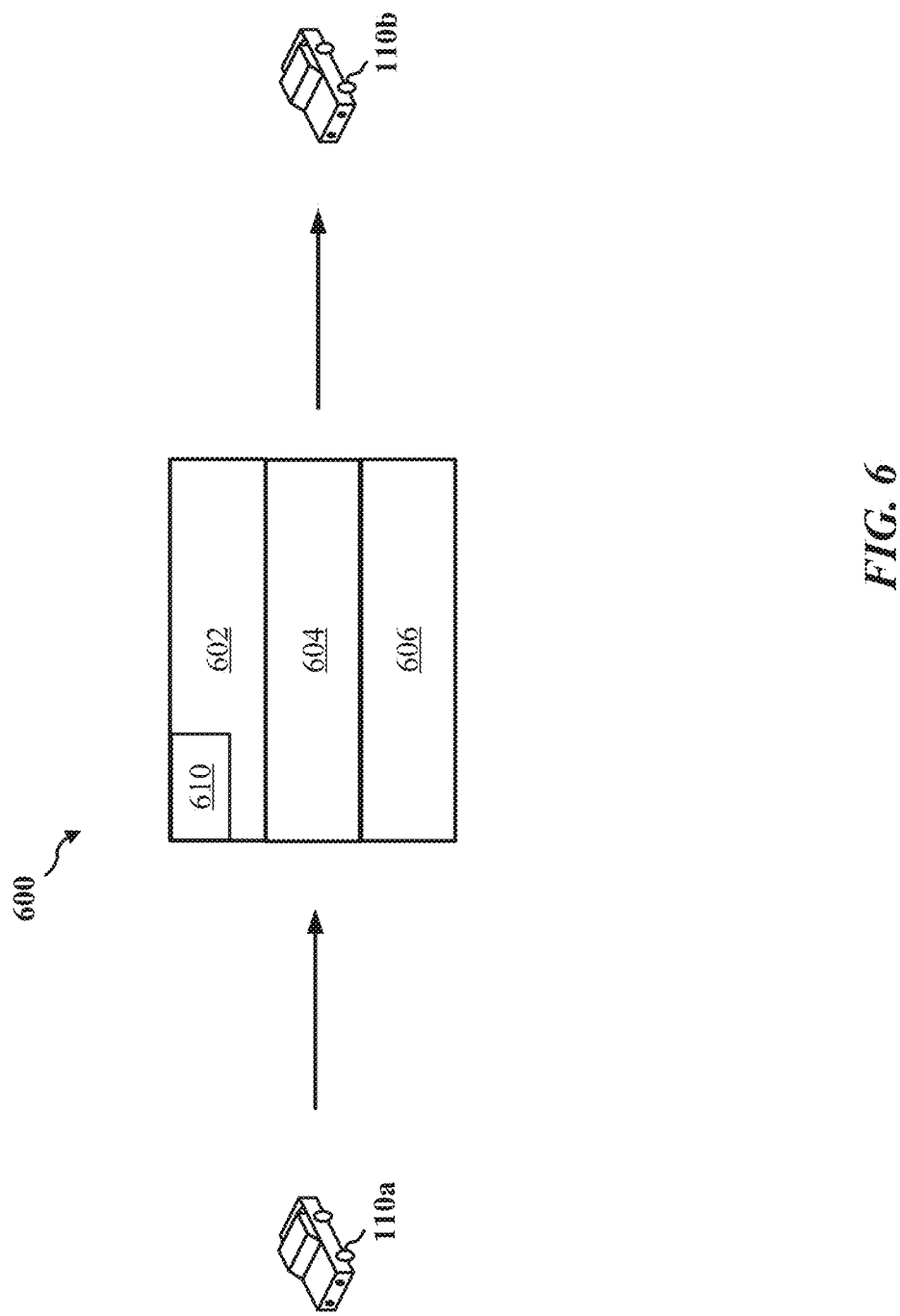
FIG. 6 illustrates an example of a transport block having frequency division multiplexed code block groups according to aspects of the present disclosure.

FIG. 6 illustrates and example of a transport block having frequency division multiplexed code block groups. In an aspect of the present disclosure, more than one CBG may occupy an orthogonal set of sub-channels (or listen-before-talk (LBT) sub-bands in the 5 GHz/6 GHz unlicensed band) to mitigate interference time selectivity (when present). A UE may dynamically switch between frequency division multiplexed CBGs and time division multiplexed CBGs based on the dominant interference pattern. For example, a UE may implement frequency division multiplexed CBGs when interference has strong frequency selectivity and time division multiplexed CBGs otherwise.

In an aspect of the present disclosure, a TX UE 110a may be scheduled to communicate with a RX UE 110b via NR SL. The TX UE 110a may transmit a TB 600 including a plurality of CBGs, such as first CBG 602, a second CBG 604, and a third CBG 606. The first CBG 602, the second CBG 604, and/or the third CBG 606 may occupy different frequency resources (e.g., sub-channels and/or sub-bands). The TB 600 may include sidelink control information (SCI) 610. The TX UE 110a may indicate in the SCI 610 that the physical sidelink share channel (PSSCH) TB includes frequency division multiplexed CBGs, such as the first CBG 602, the second CBG 604, and/or the third CBG 606 of the TB 600. In one implementation, a sub-channel may be the default frequency domain granularity. In another implementation, a sub-band may be the default frequency domain granularity. Other units may also be used as the default frequency domain granularity. The selection of the default frequency domain granularity in an unlicensed deployment may be semi-statically configured in level 3 (L3) or dynamically indicated in level 1 (L1).

In some implementations, the SCI 610 may include one or more of requests for HARQ responses, CBG transmission information (CBGTI), and/or CBG flushing out information (CBGFI). The bit-widths of the CBGTI, CBGFI, and/or the number of HARQ responses may be determined by maxCodeBlockGroupTransmission information element for PSSCH, denoted as N. The SCI 610 may optionally include an indicator whether the CBG-based transmission is arranged in time-domain or frequency-domain. Specifically, the indicator may indicate whether the CBGs in a TB is time division multiplexed or frequency division multiplexed.

Figure 7:
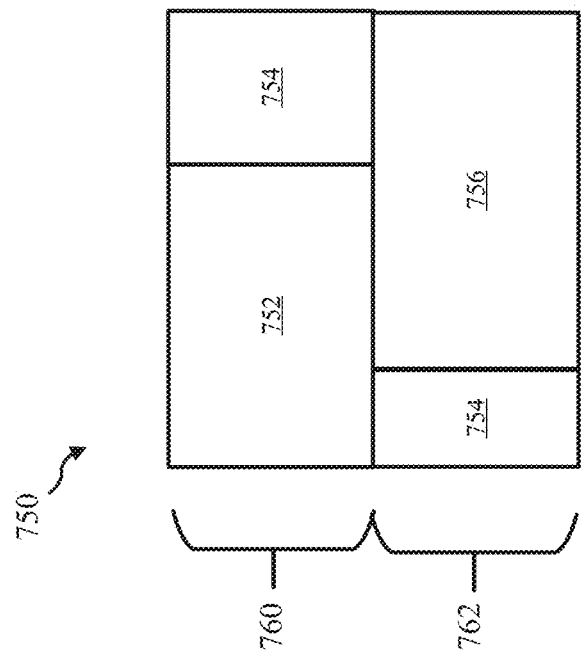
FIG. 7 illustrates examples of transport blocks with frequency division multiplexed code block groups according to aspects of the present disclosure.
Figure 7:
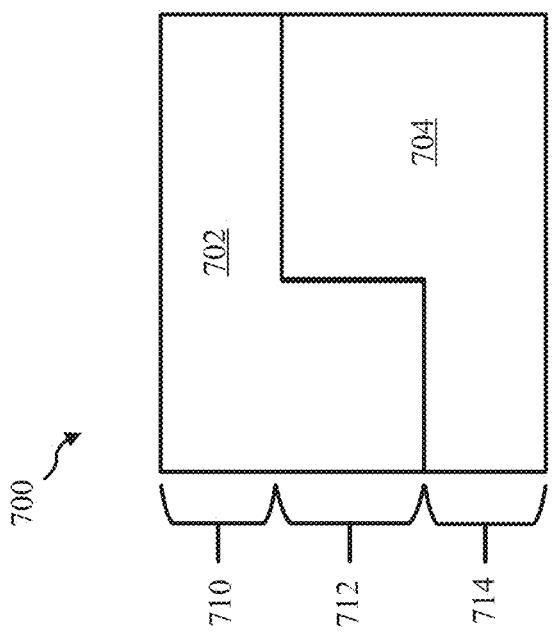

FIG. 7 illustrates examples of transport blocks with frequency division multiplexed code block groups. Frequency division multiplexed CBGs may be facilitated by applying sub-channel (or sub-band)-first rate matching for CBs. Transport block size (TBS), CB size, and/or mapping of CBs to CBGs may be determined independent of the number of sub-channels (or sub-bands) occupied by the TB. Specifically, instead of frequency-first rate matching throughout the frequency resources, sub-channel (or sub-band)-first rate matching may be applied. For instance, the first CBG may start with using the leading sub-channel (or sub-band), then moving on to other resources with increasing indices. Frequency-first rate matching may be applied within a sub-channel (or sub-band).

In an aspect of the present disclosure, a first TB 700 may include a first CBG 702 and a second CBG 704. The first TB 700 may include resources divided among three sub-channels (or sub-bands): a first sub-channel (or sub-band) 710, a second sub-channel (or sub-band) 712, and a third sub-channel (or sub-band) 714. The first sub-channel (or sub-band) 710, the second sub-channel (or sub-band) 712, and the third sub-channel (or sub-band) 714 may have the same or different bandwidths. The first TB 700 may occupy a single slot.

According to an aspect of the present disclosure, the UE 110 configuring the first TB 700 may assign the first CBG 702 to the first sub-channel (or sub-band) 710. Because the information of the first CBG 702 may require more resources than the resources in the first sub-channel (or sub-band) 710, a portion of the first CBG 702 is rate matched (based on sub-channel-first rate matching or sub-band-first rate matching) into the second sub-channel (or sub-band) 712. Because the information of the first CBG 702 may require less resources than the resources in the first sub-channel (or sub-band) 710 and the second sub-channel (or sub-band) 712, the UE 110 may assign the second CBG 704 to the second sub-channel (or sub-band) 712 after the end of the first CBG 702. A guard band, cyclic redundant check (CRC) bits, and/or reference signals (not shown) may optionally be placed between the first CBG 702 and the second CBG 704. The second CBG 704 may continue into the third sub-channel (or sub-band) 714 based on sub-channel-first rate matching or sub-band-first rate matching. The first CBG 702 and/or the second CBG 704 may optionally include padding bits.

In some aspects, a second TB 750 may include a third CBG 752, a fourth CBG 754, and a fifth CBG 756. The second TB 750 may include resources divided among two sub-channels (or sub-bands): a fourth sub-channel (or sub-band) 760 and a fifth sub-channel (or sub-band) 762. The fourth sub-channel (or sub-band) 760 and the fifth sub-channel (or sub-band) 762 may have the same or different bandwidths. The second TB 750 may occupy a single slot.

According to an aspect of the present disclosure, the UE 110 configuring the second TB 750 may assign the third CBG 752 to the fourth sub-channel (or sub-band) 760. Because the information of the third CBG 752 may require less resources than the resources in the fourth sub-channel (or sub-band) 760, the UE 110 may assign the fourth CBG 754 to begin after the third CBG 752 in the fourth sub-channel (or sub-band) 760. The fourth CBG 754 may continue into the fifth sub-channel (or sub-band) 762 based on sub-channel-first rate matching or sub-band-first rate matching. The information of the fourth CBG 754 may not "fill" the fifth sub-channel (or sub-band) 762. As a result, the UE 110 may assign the fifth CBG 756 to begin after the fourth CBG 754 in the fifth sub-channel (or sub-band) 762. A guard band, cyclic redundant check (CRC) bits, and/or reference signals (not shown) may optionally be placed between the third CBG 752 and the fourth CBG 754 and/or the fourth CBG 754 and the fifth CBG 756. The third CBG 752, the fourth CBG 754, and/or the fifth CBG 756 may optionally include padding bits.

Figure 8:
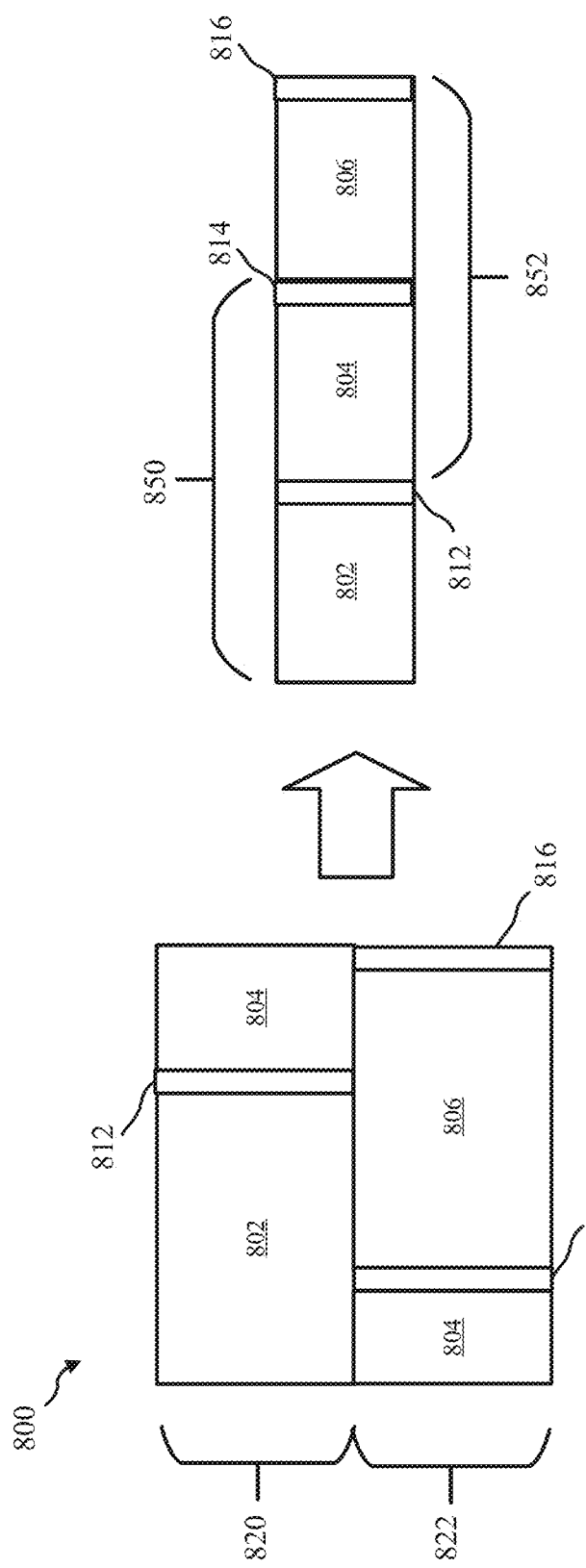
FIG. 8 illustrates an example of a method for mapping code blocks to overlapping code block groups according to aspects of the present disclosure.

FIG. 8 illustrates an example of a method for mapping code blocks to overlapping code block groups. For C CBs and S sub-channels (or sub-bands) in a TB, when C>N and C>S, the C CBs may be mapped to a number of overlapping CBGs. In an aspect, a TB 800 may include a first CB 802 having a first CRC 812, a second CB 804 having a second CRC 814, and a third CB 806 having a third CRC 816. The TB may include a first sub-channel (or sub-band) 820 and a second sub-channel (or sub-band) 822. The CRCs may be associated with the appended CBs. For example, the first CRC 812 may include the CRC for the first CB 802.

In an aspect of the present disclosure, the first CB 802, the second CB 804, and the third CB 806 may be mapped to two CBGs: a first CBG 850 and a second CBG 852. Specifically, the first CB 802 (along with the first CRC 812) and the second CB 804 (along with the second CRC 814) may be mapped to the first CBG 850. The second CB 804 (along with the second CRC 814) and the third CB 806 (along with the third CRC 816) may be mapped to the second CBG 852. The second CB 804 may be included in both the first CBG 850 and the second CBG 852. The receiving UE may report an acknowledgment (ACK) (e.g., acknowledgement response for HARQ) when all the CBs in a CBG pass CRC checks. Otherwise, the receiving UE may transmit a negative acknowledgment (NACK). For example, a receiving UE may receive the first CBG 850 and the second CBG 852. The receiving UE may transmit a HARQ ACK associated with the first CBG 850 after the first CB 802 passes the CRC check based on the first CRC 812 and the second CB 804 passes the CRC check based on the second CRC 814. The receiving UE may transmit a HARQ NACK (negative acknowledgement) after the third CB 806 fails the CRC check based on the third CRC 816, even though the second CB 804 passes the CRC check.

In certain implementations, sub-channel (or sub-band) centric frequency division multiplexed CBGs may include a per sub-channel (or sub-band) modulation and coding scheme (MCS) in the SCI. This may reduce signaling overhead by not duplicating SCI bits for frequency division multiplexed PSCCH/PSSCH. The respective MCSs may be determined by the UE (operating in NR SL mode 2) according to what had been obtained in the sensing procedure. The respective MCS may be determined by a base station (when the UE operates in NR SL Mode 1), when some resources granted to the jumbo TB are partially reused by another SL link.

Figure 9:
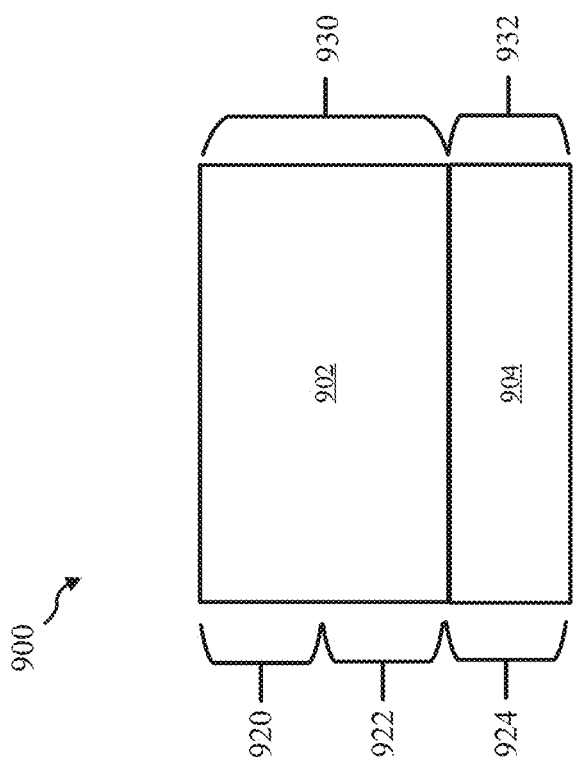
FIG. 9 illustrates an example of a sub-channel centric frequency division multiplexed code block group according to aspects of the present disclosure.

FIG. 9 illustrates an example of a sub-channel centric frequency division multiplexed code block group. The number of CBGs is determined as M=min(N,S). The variables $M_1$=mod(S,M), $K_1$=⌈S/M⌉, and $K_2$=⌊S/M⌋ may be used to determine the mapping from sub-channels (or sub-bands) to CBGs as follows. If $M_1$>0, CBG m, where m=0, 1, ..., $M_1$−1, may include sub-channels (or sub-bands) with indices m*$K_1$+k, k=0, 1, ..., $K_1$−1. CBG m, where m=$M_1$, $M_1$+1, ..., M−1, may include sub-channels (or sub-bands) with indices $M_1$*$K_1$+(m−$M_1$)*$K_2$+k, k=0, 1, ..., $K_2$−1. Each CBG may include one or more sub-channels (or sub-bands), which may be referred to as a sub-channel group and/or a sub-band group.

In an aspect of the present disclosure, a TB 900 may include a first CBG 902 and a second CBG 904. The first CBG 902 may occupy a first sub-channel (or sub-band) 920 and a second sub-channel (or sub-band) 922, or alternatively a first sub-channel (or sub-band) group 930. The second CBG 904 may occupy a third sub-channel (or sub-band) 924, or alternatively a second sub-channel (or sub-band) group 932.

In certain implementations, sub-channel (or sub-band) centric frequency division multiplexed CBGs may include a per sub-channel (or sub-band) modulation and coding scheme (MCS) in the SCI. This may reduce signaling overhead by not duplicating SCI bits for frequency division multiplexed PSCCH/PSSCH. The respective MCSs may be determined by the UE (operating in NR SL mode 2) according to what had been obtained in the sensing procedure. The respective MCS may be determined by a base station (when the UE operates in NR SL Mode 1), when some resources granted to the jumbo TB are partially reused by another SL link.

Figure 10:
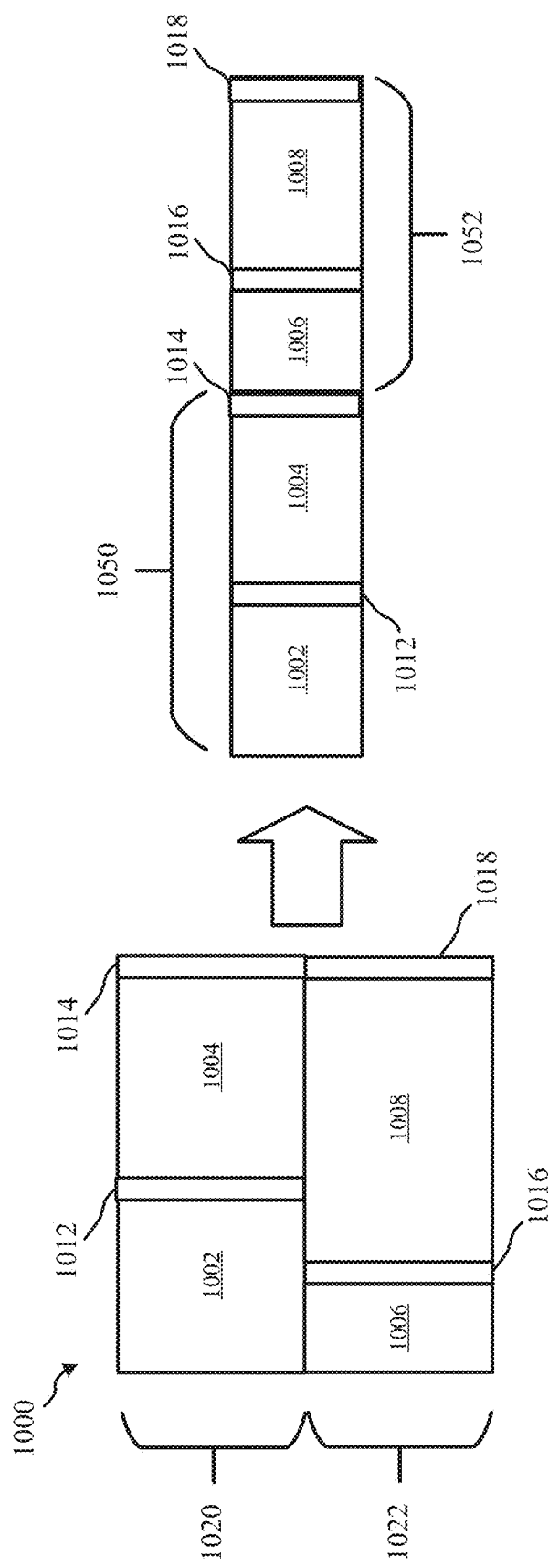
FIG. 10 illustrates an example of a virtual transport block having more than one sub-channel group according to aspects of the present disclosure.

FIG. 10 illustrates an example of a virtual transport block having more than one sub-channel group. Code blocks within a sub-channel group may be constructed via a virtual TB. In an aspect of the present disclosure, a virtual TBS having more than one sub-channel (or sub-band) group may be calculated using conventional procedures. For a sub-channel group without PSCCH, $N_{RE}^{SCI,1}$=0. $N_{RE}^{SCI,2}$ may be calculated based on the number of resource elements (REs) occupied by a stage-two SCI. The number of CBs may be calculated for the virtual TB for each sub-channel (or sub-band) group. If the number of CB is 1, a CRC associated with the CB may be inserted. A CBG may include all of the CBs in the same sub-channel (or sub-band) group.

In certain aspects of the present disclosure, a virtual TB 1000 may include a first CB 1002 and a first CRC 1012, a second CB 1004 and a second CRC 1014, a third CB 1006 and a third CRC 1016, and a fourth CB 1008 and a fourth CRC 1018. The first CB 1002 and the second CB 1004 (along with the first CRC 1012 and the second CRC 1014) may be in a first sub-channel (or sub-band) group 1020. The third CB 1006 and the fourth CB 1008 (along with the third CRC 1016 and the fourth CRC 1018) may be in a second sub-channel (or sub-band) group 1022.

In an aspect of the present disclosure, the first CB 1002, the second CB 1004, the third CB 1006, and the fourth CB 1008 may be mapped to two CBGs: a first CBG 1050 and a second CBG 1052. Specifically, the first CB 1002 (along with the first CRC 1012) and the second CB 1004 (along with the second CRC 1014) may be mapped to the first CBG 1050. The third CB 1006 (along with the third CRC 1016) and the fourth CB 1008 (along with the fourth CRC 1018) may be mapped to the second CBG 1052. The receiving UE may report an ACK when all the CBs in a CBG pass CRC checks. Otherwise, the receiving UE may transmit a NACK. For example, a receiving UE may receive the first CBG 1050 and the second CBG 1052. The receiving UE may transmit a HARQ ACK associated with the first CBG 1050 after the first CB 1002 passes the CRC check based on the first CRC 1012 and the second CB 1004 passes the CRC check based on the second CRC 1014. The receiving UE may transmit a HARQ NACK after the third CB 1006 fails the CRC check based on the third CRC 1016 and the fourth CB 1008 passes the CRC check based on the fourth CRC 1018.

In certain implementations, sub-channel (or sub-band) centric frequency division multiplexed CBGs may include a per sub-channel (or sub-band) modulation and coding scheme (MCS) in the SCI. This may reduce signaling overhead by not duplicating SCI bits for frequency division multiplexed PSCCH/PSSCH. The respective MCSs may be determined by the UE (operating in NR SL mode 2) according what had been obtained in the sensing procedure. The respective MCS may be determined by a base station (when the UE operates in NR SL Mode 1), when some resources granted to the jumbo TB are partially reused by another SL link.

Figure 11:
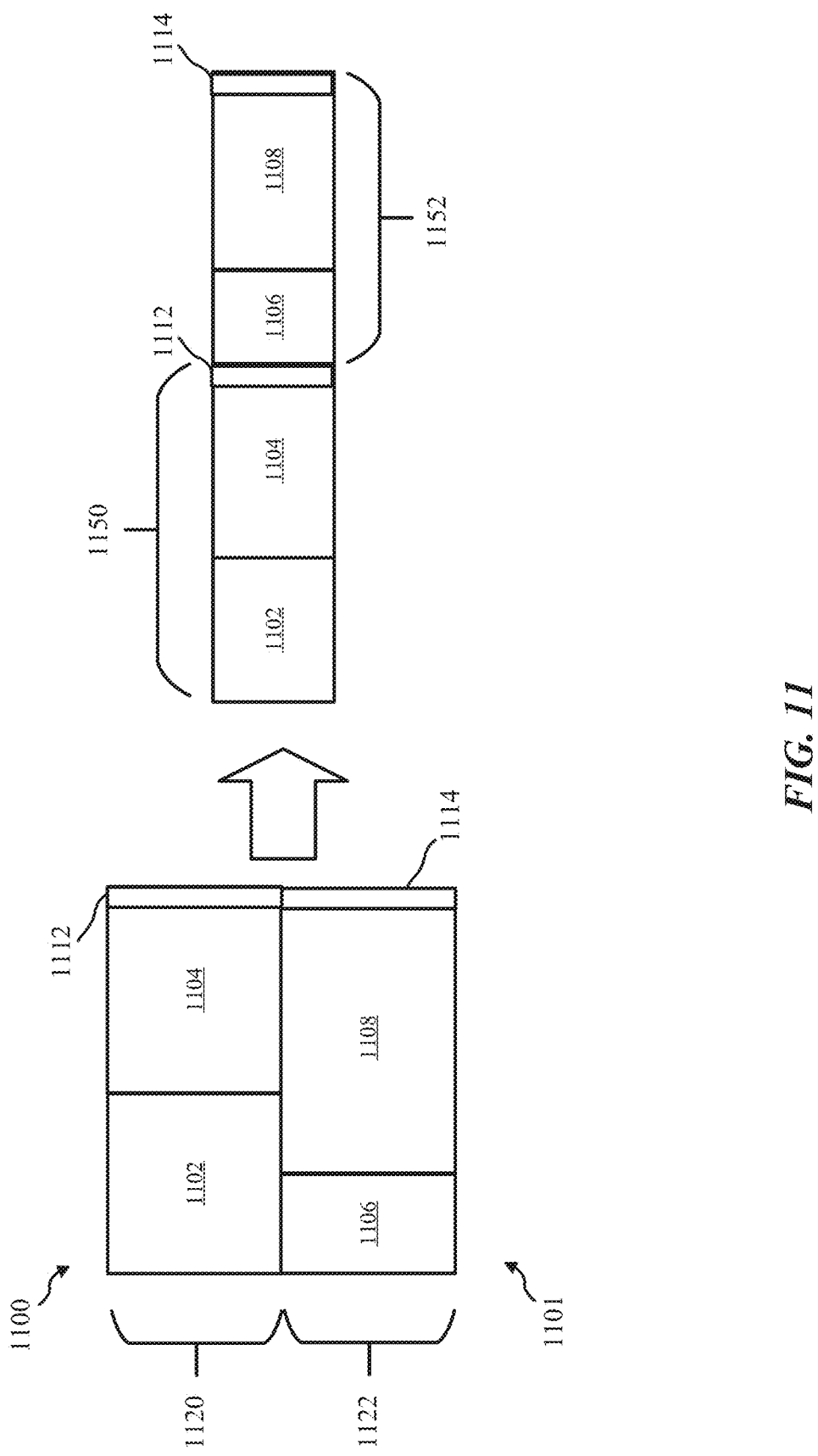
FIG. 11 illustrates an example of virtual transport blocks each associated with a sub-channel or sub-band group according to aspects of the present disclosure.

FIG. 11 illustrates an example of virtual transport blocks each associated with a sub-channel or sub-band group. Code blocks within a sub-channel group may be constructed via a virtual TB. In an aspect of the present disclosure, a virtual TBS for each sub-channel (or sub-band) group may be calculated using conventional procedures. For a sub-channel group without PSCCH, $N_{RE}^{SCI,1}$=0. $N_{RE}^{SCI,2}$ may be calculated based on the number of resource elements (REs) occupied by a stage-two SCI. The number of CBs may be calculated for the virtual TB in each sub-channel (or sub-band) group. If the number of CB is 1, a CRC associated with the CB may be inserted. A virtual TB may include all of the CBs in the same sub-channel (or sub-band) group.

In certain aspects of the present disclosure, a first virtual TB 1100 may include a first CB 1102 and a second CB 1104. A second virtual TB 1101 may include a third CB 1106 and a fourth CB 1108. The first virtual TB 1100 may include a first CRC 1112. The second virtual TB 1101 may include a second CRC 1114. The first CB 1102 and the second CB 1104 (along with the first CRC 1112) may be in a first sub-channel (or sub-band) group 1120. The third CB 1106 and the fourth CB 1108 (along with the second CRC 1114) may be in a second sub-channel (or sub-band) group 1122.

In an aspect of the present disclosure, the first CB 1102, the second CB 1104, the third CB 1106, and the fourth CB 1108 may be mapped to two CBGs: a first CBG 1150 and a second CBG 1152. Specifically, the first CB 1102 and the second CB 1104 (along with the first CRC 1112) may be mapped to the first CBG 1150. The third CB 1106 and the fourth CB 1108 (along with the second CRC 1114) may be mapped to the second CBG 1152. The receiving UE may report an ACK when all the CBs in a CBG pass CRC checks. Otherwise, the receiving UE may transmit a NACK. For example, a receiving UE may receive the first CBG 1150 and the second CBG 1152. The receiving UE may transmit a HARQ ACK associated with the first CBG 1150 after the first CB 1102 and the second CB 1104 pass the CRC check based on the first CRC 1112. The receiving UE may transmit a HARQ ACK after the third CB 1106 and the fourth CB 1108 passes the CRC check based on the second CRC 1114.

In certain implementations, sub-channel (or sub-band) centric frequency division multiplexed CBGs may include a per sub-channel (or sub-band) modulation and coding scheme (MCS) in the SCI. This may reduce signaling overhead by not duplicating SCI bits for frequency division multiplexed PSCCH/PSSCH. The respective MCSs may be determined by the UE (operating in NR SL mode 2) according to what had been obtained in the sensing procedure. The respective MCS may be determined by a base station (when the UE operates in NR SL Mode 1), when some resources granted to the jumbo TB are partially reused by another SL link.

Figure 12:
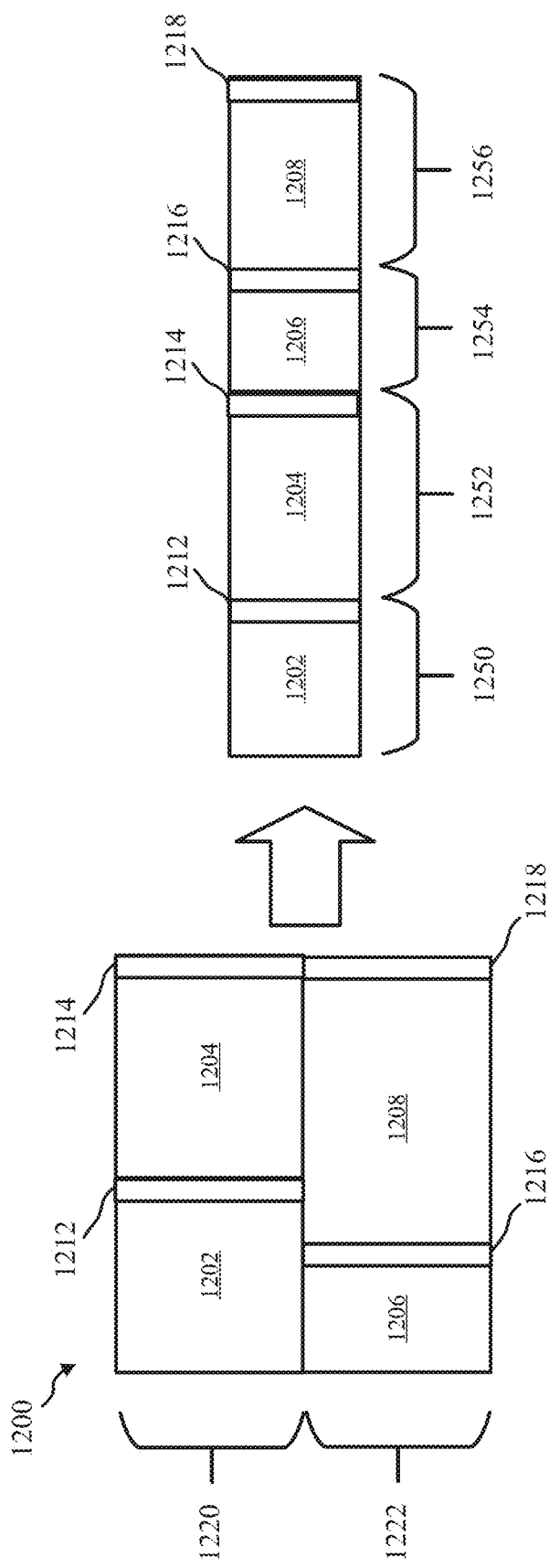
FIG. 12 illustrates an example of a transport block having multiple code block groups in a sub-channel group or a sub-band group according to aspects of the present disclosure.

FIG. 12 illustrates an example of a transport block having multiple code block groups in a sub-channel group or a sub-band group. When N>S, some bits pre-allocated to CBGTI/CBGFI and HARQ responses may be wasted when there are more than one CB per sub-channel (or sub-band) group. Denoting the number of CBs per sub-channel (or sub-band) group as $\{C_1, C_2, \ldots, C_S\}$, and the number of CBGs per sub-channel (or sub-band) group as $\{g_1, g_2, \ldots, g_S\}$, an aspect of the present disclosure may allocate R=N−S to the respective sub-channel (or sub-band) group using the below procedure. At step 1, rank sub-channel (or sub-band) groups according to $C_i/g_i$, suppose is the top one. At step 2, if $C_i'>g_i'$, then $g_i$++; exit otherwise. At step 3, R−−. if R>0, then go to Step 1; exit otherwise.

In certain aspects of the present disclosure, a virtual TB 1200 may include a first CB 1202 and a first CRC 1212, a second CB 1204 and a second CRC 1214, a third CB 1206 and a third CRC 1216, and a fourth CB 1208 and a fourth CRC 1218. The first CB 1202 and the second CB 1204 (along with the first CRC 1212 and the second CRC 1214) may be in a first sub-channel (or sub-band) group 1220. The third CB 1206 and the fourth CB 1208 (along with the third CRC 1216 and the fourth CRC 1218) may be in a second sub-channel (or sub-band) group 1222.

In an aspect of the present disclosure, the first CB 1202, the second CB 1204, the third CB 1206, and the fourth CB 1208 may be mapped to four CBGs: a first CBG 1250, a second CBG 1252, a third CBG 1254, and a fourth CBG 1256. Specifically, the first CB 1202 (along with the first CRC 1212) may be mapped to the first CBG 1250. The second CB 1204 (along with the second CRC 1214) may be mapped to the second CBG 1252. The third CB 1206 (along with the third CRC 1216) may be mapped to the third CBG 1254. The fourth CB 1208 (along with the fourth CRC 1218) may be mapped to the fourth CBG 1256.

Figure 13:
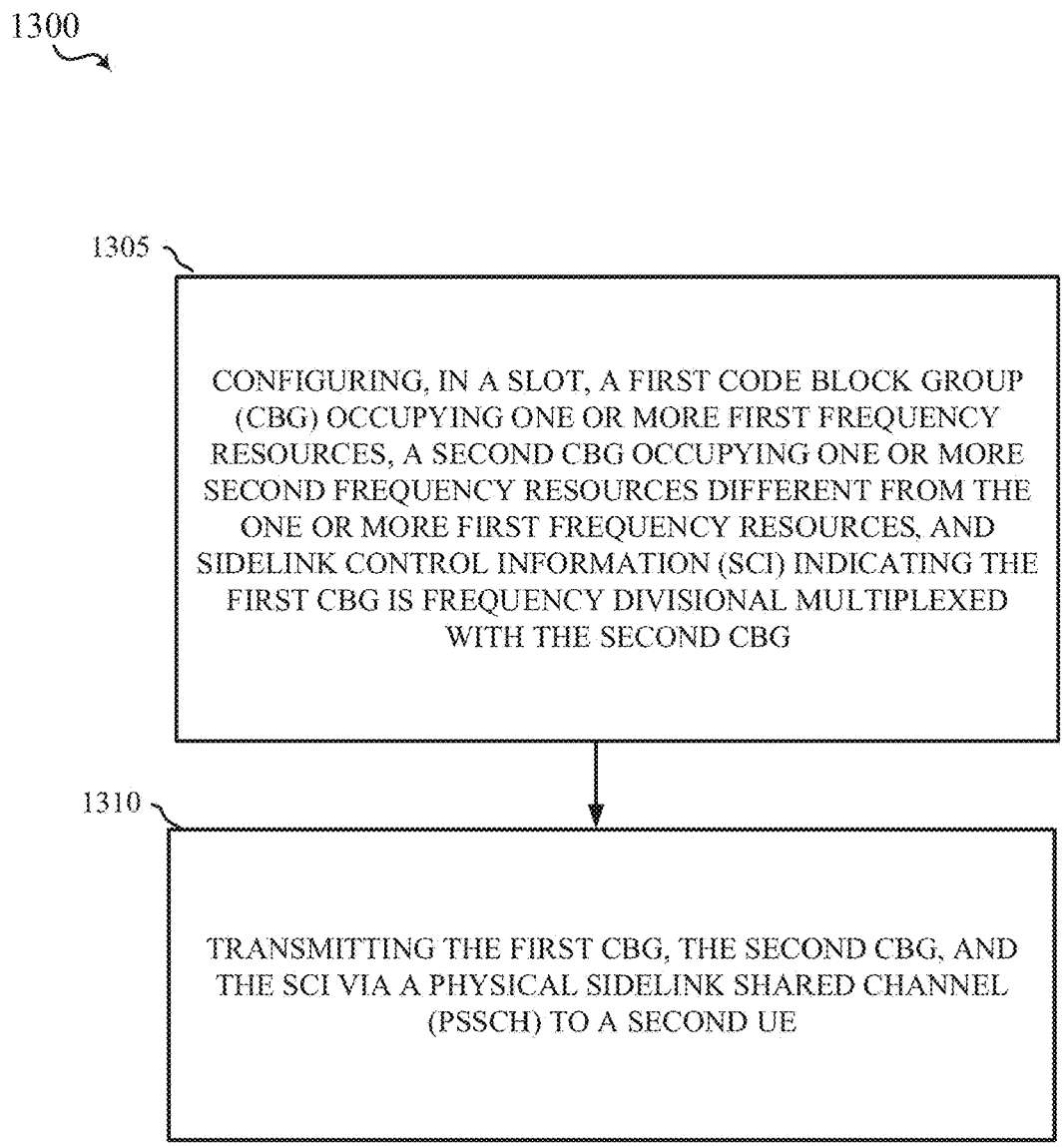
FIG. 13 illustrates an example of a method for transmitting frequency division multiplexed code block groups according to aspects of the present disclosure.

FIG. 13 illustrates an example of a method for transmitting frequency division multiplexed code block groups. For example, a method 1300 may be performed by the one or more of the processor 212, the memory 216, the applications 275, the modem 220, the transceiver 202, the receiver 206, the transmitter 208, the RF front end 288, the communication component 222 and the configuration component 224, and/or one or more other components of the UE 110 in the wireless communication network 100.

At block 1305, the method 1300 may configure, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG. For example, the configuration component 224, the processor 212, the memory 216, the modem 220, and/or the applications 275 of the UE 110 may configure, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG as described above.

In certain implementations, the configuration component 224, the processor 212, the memory 216, the modem 220, and/or the applications 275 may be configured to and/or may define means for configuring, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG.

At block 1310, the method 1300 may transmit the first CBG, the second CBG, and the SCI via a physical sidelink shared channel (PSSCH) to a second UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the first CBG, the second CBG, and the SCI via a physical sidelink shared channel (PSSCH) to a second UE as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the first CBG, the second CBG, and the SCI via a physical sidelink shared channel (PSSCH) to a second UE.

Alternatively or additionally, the method 1300 may further include any of the methods above, further comprising receiving a configuration dynamically in level 1 (L1) or semi-statically in level 3 (L3) to indicate the one or more first frequency resources or the one or more second frequency resources are represented as sub-channels or sub-bands in an unlicensed band.

Alternatively or additionally, the method 1300 may further include any of the methods above, further comprising performing frequency rate matching on one of the first CBG or the second CBG.

Alternatively or additionally, the method 1300 may further include any of the methods above, further comprising configuring a third CBG, a fourth CBG, and a fifth CBG in the slot, and wherein configuring the first CBG and the second CBG comprises reconfiguring, in response to a number of CBGs being greater than a maximum number of CBGs per slot and the number of CBGs is greater than a number of sub-channels, the third CBG and the fourth CBG as the first CBG and the fourth CBG and the fifth CBG as the second CBG.

Alternatively or additionally, the method 1300 may further include any of the methods above, further comprising allocating $$\left\lceil \frac{S}{M} \right\rceil$$

sub-channels to the first CBG, and allocating $$\left\lfloor \frac{S}{M} \right\rfloor$$

sub-channels to the second CBG, wherein M=min(N,S), S is a number of sub-channels in the slot, and N is a maximum number of CBGs in the slot.

Alternatively or additionally, the method 1300 may further include any of the methods above, further comprising partitioning the first CBG into a first plurality of code blocks (CBs) each having a first cyclic redundancy check appended to a corresponding CB, and partitioning the second CBG into a second plurality of CBs each having a second cyclic redundancy check appended to a corresponding CB.

Alternatively or additionally, the method 1300 may further include any of the methods above, further comprising partitioning the first CBG into a first plurality of code blocks (CBs) having a first cyclic redundancy check appended to first plurality of CBs, and partitioning the second CBG into a second plurality of CBs each having a second cyclic redundancy check appended to second plurality of CBs.

Alternatively or additionally, the method 1300 may further include any of the methods above, wherein the SCI includes a first modulation and coding scheme (MCS) associated with the first CBG and a second MCS associated with the second CBG.

Alternatively or additionally, the method 1300 may further include any of the methods above, further comprising configuring, in the slot, a third CBG occupying the one or more first frequency resources and a fourth CBG occupying the one or more second frequency resources.

Alternatively or additionally, the method 1300 may further include any of the methods above, wherein the SCI includes an indicator configured to indicate whether the first CBG and the second CBG are time domain multiplexed or frequency domain multiplexed.

ADDITIONAL IMPLEMENTATIONS

Aspects of the present disclosure include methods by a first user equipment (UE) for configuring, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and transmitting the first CBG, the second CBG, and the SCI via a physical sidelink shared channel (PSSCH) to a second UE.

Any of the methods above, further comprising receiving a configuration dynamically in level 1 (L1) or semi-statically in level 3 (L3) to indicate the one or more first frequency resources or the one or more second frequency resources are represented as sub-channels or sub-bands in an unlicensed band.

Any of the methods above, further comprising performing frequency rate matching on one of the first CBG or the second CBG.

Any of the methods above, further comprising configuring a third CBG, a fourth CBG, and a fifth CBG in the slot, and wherein configuring the first CBG and the second CBG comprises reconfiguring, in response to a number of CBG is greater than a maximum number of CBG per slot and the number of CBG is greater than a number of sub-channels, the third CBG and the fourth CBG as the first CBG and the fourth CBG and the fifth CBG as the second CBG.

Any of the methods above, further comprising allocating $$\left\lceil \frac{S}{M} \right\rceil$$

sub-channels to the first CBG, and allocating $$\left\lfloor \frac{S}{M} \right\rfloor$$

sub-channels to the second CBG, wherein M=min(N,S), S is a number of sub-channels in the slot, and N is a maximum number of CBGs in the slot.

Any of the methods above, further comprising partitioning the first CBG into a first plurality of code blocks (CBs) each having a first cyclic redundancy check appended to a corresponding CB, and partitioning the second CBG into a second plurality of CBs each having a second cyclic redundancy check appended to a corresponding CB.

Any of the methods above, further comprising partitioning the first CBG into a first plurality of code blocks (CBs) having a first cyclic redundancy check appended to first plurality of CBs, and partitioning the second CBG into a second plurality of CBs each having a second cyclic redundancy check appended to second plurality of CBs.

Any of the methods above, wherein the SCI includes a first modulation and coding scheme (MCS) associated with the first CBG and a second MCS associated with the second CBG.

Any of the methods above, further comprising configuring, in the slot, a third CBG occupying the one or more first frequency resources and a fourth CBG occupying the one or more second frequency resources.

Any of the methods above, wherein the SCI includes an indicator configured to indicate whether the first CBG and the second CBG are time domain multiplexed or frequency domain multiplexed.

Other aspects of the present disclosure include a first user equipment (UE) having a memory comprising instructions, a transceiver, and one or more processors operatively coupled with the memory and the transceiver, the one or more processors configured to execute instructions in the memory to configure, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and transmit the first CBG, the second CBG, and the SCI via a physical sidelink shared channel (PSSCH) to a second UE.

Any of the first UEs above, wherein the one or more processors are further configured to receive a configuration dynamically in level 1 (L1) or semi-statically in level 3 (L3) to indicate the one or more first frequency resources or the one or more second frequency resources are represented as sub-channels or sub-bands in an unlicensed band.

Any of the first UEs above, wherein the one or more processors are further configured to perform frequency rate matching on one of the first CBG or the second CBG.

Any of the first UEs above, wherein the one or more processors are further configured to configure a third CBG, a fourth CBG, and a fifth CBG in the slot, and wherein configuring the first CBG and the second CBG comprises reconfiguring, in response to a number of CBG is greater than a maximum number of CBG per slot and the number of CBG is greater than a number of sub-channels, the third CBG and the fourth CBG as the first CBG and the fourth CBG and the fifth CBG as the second CBG.

Any of the first UEs above, wherein the one or more processors are further configured to allocate $$\left\lceil \frac{S}{M} \right\rceil$$

sub-channels to the first CBG, and allocate $$\left\lfloor \frac{S}{M} \right\rfloor$$

sub-channels to the second CBG, wherein M=min(N,S), S is a number of sub-channels in the slot, and N is a maximum number of CBGs in the slot.

Any of the first UEs above, wherein the one or more processors are further configured to partition the first CBG into a first plurality of code blocks (CBs) each having a first cyclic redundancy check appended to a corresponding CB, and partition the second CBG into a second plurality of CBs each having a second cyclic redundancy check appended to a corresponding CB.

Any of the first UEs above, wherein the one or more processors are further configured to partition the first CBG into a first plurality of code blocks (CBs) having a first cyclic redundancy check appended to first plurality of CBs, and partition the second CBG into a second plurality of CBs each having a second cyclic redundancy check appended to second plurality of CBs.

Any of the first UEs above, wherein the SCI includes a first modulation and coding scheme (MCS) associated with the first CBG and a second MCS associated with the second CBG.

Any of the first UEs above, wherein the one or more processors are further configured to configure in the slot, a third CBG occupying the one or more first frequency resources and a fourth CBG occupying the one or more second frequency resources.

Any of the first UEs above, wherein the SCI includes an indicator configured to indicate whether the first CBG and the second CBG are time domain multiplexed or frequency domain multiplexed.

An aspect of the present disclosure includes a first user equipment (UE) including means for configuring, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and means for transmitting the first CBG, the second CBG, and the SCI via a physical sidelink shared channel (PSSCH) to a second UE.

Any of the first user equipment (UE)s above, further comprising means for receiving a configuration dynamically in level 1 (L1) or semi-statically in level 3 (L3) to indicate the one or more first frequency resources or the one or more second frequency resources are represented as sub-channels or sub-bands in an unlicensed band.

Any of the first user equipment (UE)s above, further comprising means for performing frequency rate matching on one of the first CBG or the second CBG.

Any of the first user equipment (UE)s above, further comprising means for configuring a third CBG, a fourth CBG, and a fifth CBG in the slot, and wherein configuring the first CBG and the second CBG comprises reconfiguring, in response to a number of CBG is greater than a maximum number of CBG per slot and the number of CBG is greater than a number of sub-channels, the third CBG and the fourth CBG as the first CBG and the fourth CBG and the fifth CBG as the second CBG.

Any of the first user equipment (UE)s above, further comprising means for allocating $$\left\lceil \frac{S}{M} \right\rceil$$

sub-channels to the first CBG, and allocating $$\left\lfloor \frac{S}{M} \right\rfloor$$

sub-channels to the second CBG, wherein M=min(N,S), S is a number of sub-channels in the slot, and N is a maximum number of CBGs in the slot.

Any of the first user equipment (UE)s above, further comprising means for partitioning the first CBG into a first plurality of code blocks (CBs) each having a first cyclic redundancy check appended to a corresponding CB, and partitioning the second CBG into a second plurality of CBs each having a second cyclic redundancy check appended to a corresponding CB.

Any of the first user equipment (UE)s above, further comprising means for partitioning the first CBG into a first plurality of code blocks (CBs) having a first cyclic redundancy check appended to first plurality of CBs, and partitioning the second CBG into a second plurality of CBs each having a second cyclic redundancy check appended to second plurality of CBs.

Any of the first user equipment (UE)s above, wherein the SCI includes a first modulation and coding scheme (MCS) associated with the first CBG and a second MCS associated with the second CBG.

Any of the first user equipment (UE)s above, further comprising means for configuring, in the slot, a third CBG occupying the one or more first frequency resources and a fourth CBG occupying the one or more second frequency resources.

Any of the first user equipment (UE)s above, wherein the SCI includes an indicator configured to indicate whether the first CBG and the second CBG are time domain multiplexed or frequency domain multiplexed.

Some aspects of the present disclosure include non-transitory computer readable media having instructions stored therein that, when executed by one or more processors of a first user equipment (UE), cause the one or more processors to configure, in a slot, a first code block group (CBG) occupying one or more first frequency resources, a second CBG occupying one or more second frequency resources different from the one or more first frequency resources, and sidelink control information (SCI) indicating the first CBG is frequency divisional multiplexed with the second CBG, and transmit the first CBG, the second CBG, and the SCI via a physical sidelink shared channel (PSSCH) to a second UE.

Any of the non-transitory computer readable media above, further comprising instructions, when executed by the one or more processors, cause the one or more processors to receive a configuration dynamically in level 1 (L1) or semi-statically in level 3 (L3) to indicate the one or more first frequency resources or the one or more second frequency resources are represented as sub-channels or sub-bands in an unlicensed band.

Any of the non-transitory computer readable media above, further comprising instructions, when executed by the one or more processors, cause the one or more processors to perform frequency rate matching on one of the first CBG or the second CBG.

Any of the non-transitory computer readable media above, further comprising instructions, when executed by the one or more processors, cause the one or more processors to configure a third CBG, a fourth CBG, and a fifth CBG in the slot, and wherein configuring the first CBG and the second CBG comprises reconfiguring, in response to a number of CBG is greater than a maximum number of CBG per slot and the number of CBG is greater than a number of sub-channels, the third CBG and the fourth CBG as the first CBG and the fourth CBG and the fifth CBG as the second CBG.

Any of the non-transitory computer readable media above, further comprising instructions, when executed by the one or more processors, cause the one or more processors to allocate $$\left\lceil \frac{S}{M} \right\rceil$$

sub-channels to the first CBG, and allocate $$\left\lfloor \frac{S}{M} \right\rfloor$$

sub-channels to the second CBG, wherein M=min(N,S), S is a number of sub-channels in the slot, and N is a maximum number of CBGs in the slot.

Any of the non-transitory computer readable media above, further comprising instructions, when executed by the one or more processors, cause the one or more processors to partition the first CBG into a first plurality of code blocks (CBs) each having a first cyclic redundancy check appended to a corresponding CB, and partition the second CBG into a second plurality of CBs each having a second cyclic redundancy check appended to a corresponding CB.

Any of the non-transitory computer readable media above, further comprising instructions, when executed by the one or more processors, cause the one or more processors to partition the first CBG into a first plurality of code blocks (CBs) having a first cyclic redundancy check appended to first plurality of CBs, and partition the second CBG into a second plurality of CBs each having a second cyclic redundancy check appended to second plurality of CBs.

Any of the non-transitory computer readable media above, wherein the SCI includes a first modulation and coding scheme (MCS) associated with the first CBG and a second MCS associated with the second CBG.

Any of the non-transitory computer readable media above, further comprising instructions, when executed by the one or more processors, cause the one or more processors to configure in the slot, a third CBG occupying the one or more first frequency resources and a fourth CBG occupying the one or more second frequency resources.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a first user equipment (UE) in a network, comprising:

allocating $$\left\lceil \frac{S}{M} \right\rceil$$

sub-channels to a first code block group (CBG);

allocating $$\left\lfloor \frac{S}{M} \right\rfloor$$

sub-channels to a second CBG, wherein M=min(N,S), S is a number of sub-channels in a slot, and N is a maximum number of CBGs in the slot;

configuring, in the slot, the first CBG occupying one or more first frequency resources, the second CBG occupying one or more second frequency resources different from the one or more first frequency resources, and sidelink control information (SCI) indicating the first CBG is frequency divisional multiplexed with the second CBG; and transmitting the first CBG, the second CBG, and the SCI via a physical sidelink shared channel (PSSCH) to a second UE.

2. The method of claim 1, further comprising:

receiving a configuration dynamically in level 1 (L1) or semi-statically in level 3 (L3) to indicate the one or more first frequency resources or the one or more second frequency resources are represented as sub-channels or sub-bands in an unlicensed band.

3. The method of claim 1, further comprising:
performing frequency rate matching on one of the first CBG or the second CBG.

4. The method of claim 1, further comprising:
configuring a third CBG, a fourth CBG, and a fifth CBG in the slot; and
wherein configuring the first CBG and the second CBG comprises reconfiguring, in response to a number of CBGs is greater than a maximum number of CBGs per slot and the number of CBGs is greater than a number of sub-channels, the third CBG and the fourth CBG as the first CBG and the fourth CBG and the fifth CBG as the second CBG.

5. The method of claim 1, further comprising:
partitioning the first CBG into a first plurality of code blocks (CBs) each having a first cyclic redundancy check appended to a corresponding CB of the first plurality of CBs; and
partitioning the second CBG into a second plurality of CBs each having a second cyclic redundancy check appended to a corresponding CB of the second plurality of CBs.

6. The method of claim 1, further comprising:
partitioning the first CBG into a first plurality of code blocks (CBs) having a first cyclic redundancy check appended to the first plurality of CBs; and
partitioning the second CBG into a second plurality of CBs each having a second cyclic redundancy check appended to the second plurality of CBs.

7. The method of claim 1, wherein:
the SCI includes a first modulation and coding scheme (MCS) associated with the first CBG and a second MCS associated with the second CBG.

8. The method of claim 1, further comprising:
configuring, in the slot, a third CBG occupying the one or more first frequency resources and the one or more second frequency resources; and
performing sub-band rate matching on the third CBG.

9. The method of claim 1, wherein:
the SCI includes an indicator configured to indicate whether the first CBG and the second CBG are time domain multiplexed or frequency domain multiplexed.

10. A first user equipment (UE), comprising:
a memory comprising instructions;
a transceiver; and
one or more processors operatively coupled with the memory and the transceiver, the one or more processors configured to execute instructions in the memory to:
allocate $$\left\lfloor \frac{S}{M} \right\rfloor$$

sub-channels to a first code block group (CBG);
allocate $$\left\lfloor \frac{S}{M} \right\rfloor$$

sub-channels to a second CBG, wherein M=min(N,S), S is a number of sub-channels in a slot, and N is a maximum number of CBGs in the slot;
configure, in the slot, the first CBG occupying one or more first frequency resources, the second CBG occupying one or more second frequency resources different from the one or more first frequency resources, and sidelink control information (SCI) indicating the first CBG is frequency divisional multiplexed with the second CBG; and
transmit, via the transceiver, the first CBG, the second CBG, and the SCI via a physical sidelink shared channel (PSSCH) to a second UE.

11. The first UE of claim 10, wherein the one or more processors are further configured to:
receive, via the transceiver, a configuration dynamically in level 1 (L1) or semi-statically in level 3 (L3) to indicate the one or more first frequency resources or the one or more second frequency resources are represented as sub-channels or sub-bands in an unlicensed band.

12. The first UE of claim 10, wherein the one or more processors are further configured to:
perform frequency rate matching on one of the first CBG or the second CBG.

13. The first UE of claim 10, wherein the one or more processors are further configured to:
configure a third CBG, a fourth CBG, and a fifth CBG in the slot; and
wherein configuring the first CBG and the second CBG comprises reconfiguring, in response to a number of CBG is greater than a maximum number of CBG per slot and the number of CBG is greater than a number of sub-channels, the third CBG and the fourth CBG as the first CBG and the fourth CBG and the fifth CBG as the second CBG.

14. The first UE of claim 10, wherein the one or more processors are further configured to:
partition the first CBG into a first plurality of code blocks (CBs) each having a first cyclic redundancy check appended to a corresponding CB of the first plurality of CBs; and
partition the second CBG into a second plurality of CBs each having a second cyclic redundancy check appended to a corresponding CB of the second plurality of CBs.

15. The first UE of claim 10, wherein the one or more processors are further configured to:
partition the first CBG into a first plurality of code blocks (CBs) having a first cyclic redundancy check appended to the first plurality of CBs; and
partition the second CBG into a second plurality of CBs each having a second cyclic redundancy check appended to the second plurality of CBs.

16. The first UE of claim 10, wherein:
the SCI includes a first modulation and coding scheme (MCS) associated with the first CBG and a second MCS associated with the second CBG.

17. The first UE of claim 10, wherein the one or more processors are further configured to:
configure in the slot, a third CBG occupying the one or more first frequency resources and a fourth CBG occupying the one or more second frequency resources.

18. The first UE of claim 10, wherein:
the SCI includes an indicator configured to indicate whether the first CBG and the second CBG are time domain multiplexed or frequency domain multiplexed.

19. A non-transitory computer readable medium having instructions stored therein that, when executed by one or more processors of a first user equipment (UE), cause the one or more processors to:

allocate $$\left\lceil \frac{S}{M} \right\rceil$$

sub-channels to a first code block group (CBG);

allocate $$\left\lfloor \frac{S}{M} \right\rfloor$$

sub-channels to a second CBG, wherein M=min(N,S), S is a number of sub-channels in a slot, and N is a maximum number of CBGs in the slot;

configure, in the slot, the first CBG occupying one or more first frequency resources, a second CBG occupying one or more second frequency resources different from the one or more first frequency resources, and sidelink control information (SCI) indicating the first CBG is frequency divisional multiplexed with the second CBG; and transmit the first CBG, the second CBG, and the SCI via a physical sidelink shared channel (PSSCH) to a second UE.

20. The non-transitory computer readable medium of claim 19, further comprising instructions, when executed by the one or more processors, cause the one or more processors to:

receive a configuration dynamically in level 1 (L1) or semi-statically in level 3 (L3) to indicate the one or more first frequency resources or the one or more second frequency resources are represented as sub-channels or sub-bands in an unlicensed band.

21. The non-transitory computer readable medium of claim 19, further comprising instructions, when executed by the one or more processors, cause the one or more processors to:

perform frequency rate matching on one of the first CBG or the second CBG.

22. The non-transitory computer readable medium of claim 19, further comprising instructions, when executed by the one or more processors, cause the one or more processors to:

configure a third CBG, a fourth CBG, and a fifth CBG in the slot; and wherein configuring the first CBG and the second CBG comprises reconfiguring, in response to a number of CBG is greater than a maximum number of CBG per slot and the number of CBG is greater than a number of sub-channels, the third CBG and the fourth CBG as the first CBG and the fourth CBG and the fifth CBG as the second CBG.

23. The non-transitory computer readable medium of claim 19, further comprising instructions, when executed by the one or more processors, cause the one or more processors to:

partition the first CBG into a first plurality of code blocks (CBs) each having a first cyclic redundancy check appended to a corresponding CB in the first plurality of CBs; and partition the second CBG into a second plurality of CBs each having a second cyclic redundancy check appended to a corresponding CB in the second plurality of CBs.

24. The non-transitory computer readable medium of claim 19, further comprising instructions, when executed by the one or more processors, cause the one or more processors to:

partition the first CBG into a first plurality of code blocks (CBs) having a first cyclic redundancy check appended to the first plurality of CBs; and partition the second CBG into a second plurality of CBs each having a second cyclic redundancy check appended to the second plurality of CBs.

25. The non-transitory computer readable medium of claim 19, wherein:

the SCI includes a first modulation and coding scheme (MCS) associated with the first CBG and a second MCS associated with the second CBG.

26. The non-transitory computer readable medium of claim 19, further comprising instructions, when executed by the one or more processors, cause the one or more processors to:

configure in the slot, a third CBG occupying the one or more first frequency resources and a fourth CBG occupying the one or more second frequency resources.

27. A first user equipment (UE), comprising:

means for allocating $$\left\lceil \frac{S}{M} \right\rceil$$

sub-channels to a first code block group (CBG);

means for allocating $$\left\lfloor \frac{S}{M} \right\rfloor$$

sub-channels to a second CBG, wherein M=min(N,S), S is a number of sub-channels in a slot, and N is a maximum number of CBGs in the slot;

means for configuring, in the slot, the first CBG occupying one or more first frequency resources, a second CBG occupying one or more second frequency resources different from the one or more first frequency resources, and sidelink control information (SCI) indicating the first CBG is frequency divisional multiplexed with the second CBG; and means for transmitting the first CBG, the second CBG, and the SCI via a physical sidelink shared channel (PSSCH) to a second UE.

28. The first UE of claim 27, further comprising:

means for receiving a configuration dynamically in level 1 (L1) or semi-statically in level 3 (L3) to indicate the one or more first frequency resources or the one or more second frequency resources are represented as sub-channels or sub-bands in an unlicensed band.

29. The first UE of claim 27, further comprising:

means for performing frequency rate matching on one of the first CBG or the second CBG.

30. The first UE of claim 27, further comprising:

means for partitioning the first CBG into a first plurality of code blocks (CBs) each having a first cyclic redundancy check appended to a corresponding CB of the first plurality of CBs; and means for partitioning the second CBG into a second plurality of CBs each having a second cyclic redundancy check appended to a corresponding CB of the second plurality of CBs.

* * * * *